United States Patent [19]

Foudriat et al.

[11] Patent Number: 5,229,993
[45] Date of Patent: Jul. 20, 1993

[54] CONTROL OF ACCESS THROUGH LOCAL CARRIER SENSING FOR HIGH DATA RATE NETWORKS AND CONTROL OF ACCESS OF SYNCHRONOUS MESSAGES THROUGH CIRCULATING RESERVATION PACKETS

[75] Inventors: Edwin Foudriat, Yorktown; Kurt Maly; C. M. Overstreet, both of Virginia Beach; Frank Paterra; Sanjay Khanna, both of Norfolk, all of Va.

[73] Assignees: Old Dominion University, Norfolk; Center for Innovative Technology, Herndon, both of Va.

[21] Appl. No.: 660,664

[22] Filed: Feb. 25, 1991

[51] Int. Cl.$^5$ ............................................. H04J 3/26
[52] U.S. Cl. .................... 370/85.3; 370/85.5; 370/85.15; 370/94.2
[58] Field of Search ............. 370/61, 85.2, 85.3, 370/85.4, 85.5, 85.15, 94.1, 94.2; 340/825.05

[56] References Cited

U.S. PATENT DOCUMENTS

| | | | |
|---|---|---|---|
| 4,383,315 | 5/1983 | Torng | 340/825.05 |
| 4,445,116 | 4/1984 | Grow | 340/825.05 |
| 4,516,239 | 5/1985 | Maxemchuk . | |
| 4,549,292 | 10/1985 | Isaman et al. | 340/825.05 |
| 4,566,097 | 1/1986 | Bederman | 340/825.5 |
| 4,707,829 | 11/1987 | Pendse | 340/825.07 |
| 4,819,229 | 4/1989 | Pritty et al. | 370/85.5 |

OTHER PUBLICATIONS

"Implementations of Physical and Media Access Protocols for High Speed Networks", M. Skov; IEEE Communications Magazine; Jun. 1989; pp. 45-53.
"Performance Analysis of Slotted Ring Protocols in HSLANs" G. N. Niemegeers et al; J. on Selected Areas in Communications; vol. 6; No. 7; Nov. 1983; pp. 913-925.
"Performance of Unidirectional Broadcast Local Area Networks: Expressnet and Fastnet"; IEEE J. on Selected Areas in Communications; vol. SAC 1; No. 5; Nov. 1983; pp. 913-925; F. A. Tobaji et al.
"The QPSX Man"; IEEE Communications Magazine; R. M. Newman et al.; vol. 26; No. 4; Apr. 1988; pp. 20-28.
"Analysis and Simulation of the Registration and Insertion Protocol"; W. Hilal et al.; Proc. of Computer Network Symposium; Dec. 10, 1982; pp. 91-100.
"Performance Evaluation of Channel Access Protocols for Local Computer Networks"; M. T. Liu et al.; Campcon '82; Sep. 2-23, 1983; pp. 417-426.
"Fairness Problems in High Speed Networks"; K. Maly et al; Old Dominion University; Computer Science Dept.; TR-90-15; Mar. 1990.
"FDDI—An Overview"; F. Ross; IEEE Transactions on Communications; vol. 24; No. 5; May 1986; pp. 10-17.
"FDDI Token Ring Physical Layer Medium Dependent (PDM)"; asc X3T9.5/86-71; Jul. 10, 1986.
"Local Area Subnetworks: A Performance Comparison"; W. Bux; IEEE Transactions on Communications; vol. com-29; No. 10; Oct. 1981; pp. 1465-1473.
"Tree LANs with Collision Avoidance: Protocol Switch Architecture and Simulated Performance"; T. Suda; ACM 0-89791-279-9/99/008/01555.
"A Hybrid Media Access Protocol for High Speed Ring Networks"; A. Bhargava et al.; IEEE J. on Selected Areas in Communications; vol. 6; No. 6; Jul. 1988; pp. 924-933.
"Traffic Placement Policies for Multi-band Network"; K. Maly et al; ACM SIGCOMM '89 Symposium; Austin, Texas; Sep. 1989; pp. 94-105.
"The Cambridge Backbone Ring"; David J. Greaves et al; IEEE Document CH826-5/90/0000/0008; (1990).

Primary Examiner—Douglas W. Olms
Assistant Examiner—Melvin Marcelo
Attorney, Agent, or Firm—Whitham & Marhoefer

[57] ABSTRACT

A combination of two new access methods for ring and unidirectional bus networks supports high data rate integrated traffic. The first access method provides access for asynchronous traffic. When a node senses the channel idle, it can begin to transmit. When it senses an incoming signal, it must stop transmitting in order to avoid a collision. But unlike other access protocols which abort the transmission when a collision occurs or is imminent, the process truncates the message in a fashion such that it can be resumed later when the channel again is idle. The system is called Carrier Sensed Multiple Access-Ring Network (CSMA/RN). The second access method provides support for synchronous traffic. This method implements one or more circulating reservation packets which permit a node to have reserved space when the special packet returns. The media access system is called Circulating Reservation Packet (CRP) system. Both access protocols operate simultaneously on the network with minimal interference. The CRP system is preferably used with the CSMA/RN protocol but is applicable to other fixed length, non-corrupting, circulating network structures to enable the nodes in a network to reserve space for synchronous traffic and guaranteed access.

12 Claims, 6 Drawing Sheets

| CRC | End Block | Data | Packet Count | Source Address | Destination Address | Control | Synch. Header |
|---|---|---|---|---|---|---|---|
| 16 bits | 8 bits | variable length (bytes) | 4 bits | 16 bits | 16 bits | 4 bits | 8 bits |

PACKET FRAME STRUCTURE

FIG.4

| CRC | End Block | Reservation Length | CRP Packet No | Node Address | Control | Synch. Header |
|---|---|---|---|---|---|---|
| 16 bits | 8 bits | 16 bits | 8 bits | 16 bits | 4 bits | 8 bits |

CRP FRAME STRUCTURE

FIG.5

CONTROL OF ACCESS THROUGH LOCAL CARRIER SENSING FOR HIGH DATA RATE NETWORKS AND CONTROL OF ACCESS OF SYNCHRONOUS MESSAGES THROUGH CIRCULATING RESERVATION PACKETS

BACKGROUND OF THE INVENTION

1. Field of the Invention

The present invention generally relates to computer communication networks and, more particularly, to a new concepts for controlling access to high data rate ring or unidirectional bus networks. More specifically, the invention is directed to high data rate networks capable of supporting a variety of traffic types, including voice, video and computer data transferred both asynchronously and synchronously with varying bandwidths.

2. Description of the Prior Art

Communication networks have made possible distributed processing between all classes of computers from super computers to personal computers, promoting greater efficiency and productivity. Both baseband and broadband networks have been developed. Various topologies including star, ring and bus based networks have been implemented. Access control to the networks is required to permit a node to transmit its information on to the network without interfering with or corrupting information traveling on the network.

In a parallel development, multi-media systems are gaining increasing adherents. Such systems support high-quality images, audio, animation and full-motion video. Voice annotations added to business presentations and free-form database queries made through a graphic user interface (GUI) are among the many and diverse advantages of multimedia systems. To support multi-media systems, high data rate networks are required for all types of traffic including voice, video and computer data. Voice and video are referred to as synchronous traffic since new data to transmit occurs at a prescribed rate. Computer data is called asynchronous since its time and rate of occurrence are irregular. Synchronous traffic demands a different quality of service than asynchronous traffic because it requires guaranteed access of the network for fixed blocks at a fixed rate.

Mechanisms proposed for supporting integrated traffic within the access protocol can be divided into two basic categories. The first attempts to provide a mechanism within the framework of the access protocol to support synchronous and asynchronous traffic. This usually results in some type of priority or control system which regulates normal access so that all synchronous traffic can be submitted within a limited time scope and repeated periodically. A second type of support for integrated traffic uses two media access mechanisms in a single network. In this class, uniframe techniques have been used almost exclusively to provide for the synchronous traffic. Uniframe is based upon the 125 microsecond ($\mu$sec) telephone virtual circuit frame and supplies a fixed number of 8-bit slots. Each slot is reserved for a synchronous call circuit or a video circuit. Asynchronous traffic uses either the empty slots or is provided a space after one uniframe frame has completed and before the next one begins.

More than sixty different media access protocols for networks operating in the range of 50 to 5000 Mbps have been reported by M. Skov in "Implementation of Physical and Media Access Protocols for High Speed Networks", *IEEE Communications Magazine,* June 1989, pp. 45-53. At 100 Mbps and above, most networks use fiber optical media because of the signal attenuation advantage and the higher data rate capability. Because of the inability to construct low loss taps other than star couplers, fiber optical networks are usually point-to-point. In many cases, this results in networks that are either rings or unidirectional buses with each node containing at least one transmitter and receiver with each node forwarding messages, either those received from other nodes on the network or generated at the node, to the succeeding or a down stream node.

Many of these network systems use demand assignment access protocol. Implementation of the protocol concept can take many forms including token ring, like the Fiber Distributed Data Interface (FDDI), where a node must capture the token before it is allowed to send its messages; slotted ring, such as the Cambridge Ring, where slots are tested for empty or full status; "attempt and defer", as implemented, for example, by Metrocore, where a node starts transmitting while the slot is being tested and aborts if the slot is full; polled access; or a slotted reservation system, such as Distributed Queue, Dual Bus (DQDB), where the need for free slots are sent to the upstream nodes in an effort to maintain fair access for all nodes. One feature of all demand assignment access protocols is that they are contention or collision free; that is, it is known at the time which they start transmitting a queued message that they will not interfere with messages on the network for the period which they are transmitting. For example, in a slotted system, this would be the time period of a slot. Operations for these and related systems are discussed by M. Skov, supra, and other papers including the Cambridge Ring described by M. Zafirovic-Vukotic, I. G. Niemegeers and D. S. Valk in "Performance Analysis of Slotted Ring Protocols in HSLANs", *Jour. on Selected Areas in Communications,* vol. 6, no. 6, July 1988, pp. 1011-1023; Expressnet and Fastnet described by F. A. Tobaji and M. Fine in "Performance of Unidirectional Broadcast Local Area Networks Expressnet and Fastnet", *IEEE Jour. on Selected Areas in Communications,* vol. SAC-1, no. 5, Nov. 1983, pp. 913-925; and DQDB (formerly QPSX) described by R. M. Newman, Z. L. Budrikis and J. L. Hullett in "The QPSX Man", *IEEE Communications Magazine,* vol. 26, no. 4, April 1988, pp. 20-28.

One form of a demand assignment access protocol, the register-insertion system, described by W. Hilal and M. T. Liu in "Analysis and Simulation of the Registration-Insertion Protocol", *Proc. of Computer Networking Symposium,* Dec. 10, 1982, pp. 91-100, and M. T. Liu, W. Hilal and B. H. Groomes in "Performance Evaluation of Channel Access Protocols for Local Computer Networks", *Proc. Computer Networks,* Compcon '82, Sept. 2-23, 1983, pp. 417-426, uses a buffer to assist in controlling access. When a node wishes to transmit, it inserts its empty buffer in the incoming stream link so that any incoming message may be saved until it completes transmission of its queued message. It then empties the buffer, forwarding the delayed message. It must have an empty buffer before it can start the transmission process. Buffer size can limit the size of the messages.

In slotted systems, long messages must be broken into slot size proportions contributing to fracture of the message and wasted network capacity, since the slot size selected is always a compromise over the wide range of message traffic size. In addition, slotting or polling causes delay even at low loads because a queued message must wait until the head of a slot or the cessation of the polling before it can start transmitting. The register insertion method can slow travel for messages on the network. Even though demand assignment access protocols provide full utilization at capacity loads, recent studies indicate that reservation systems have fairness difficulties when servicing nodes at the ends of the bus under high load conditions. See K. Maly, L. Zhang and D. Game, "Fairness Problems in High-Speed Networks", Old Dominion University, Computer Science Dept., TR-90-15, Mar. 1990. Other demand access systems may use a token, like FDDI, but waiting for the token to rotate can cause increased access delay, especially in longer length and higher data rate networks. See F. Ross, "FDDI—A Tutorial", IEEE Transactions on Communications, vol. 24, no. 5, May 1986, pp. 10-17, and the draft of the proposed American National Standard entitled "FDDI Token Ring Media Access Control (mac)", asc ×3t9.5 rev. 10, Feb 28, 1986. Most demand assignment systems can be considered to operate under "attempt and defer" conditions although register-insertion has an "attempt and hold" mode as well.

The adaptive assignment or random access protocols use a somewhat different form of access from contention free protocols. These systems, like contention free protocols, sense the presence or absence of a message on the network. If the network is free, the node can begin to transmit. However, sensing a free network does not assure collision free access for the period of time necessary to transmit the message. If a collision occurs, the information on the network is corrupted. The nodes which have transmitted messages must be able to detect the fact that a collision has occurred and retransmit their messages when the network is again idle. These systems are generally classified as Carrier Sensed Multiple Access (CSMA). Ethernet, a shared channel system, is designed to detect collisions (CD) shortly after they have occurred, allowing the conflicting nodes to quickly abort transmissions and bring the network to idle sooner, thereby reducing wasted capacity. As bandwidth increases, a message spans a smaller portion of the global bus length so network collisions can still reduce throughput significantly, especially at higher loads when collisions are more likely. See W. Bux, "Local Area Subnetworks: A Performance Comparison", IEEE Trans. on Communications, vol. Com-29, no. 10, Oct. 1981, pp. 91-100. The adaptive or random assignment access systems can be considered to be in the class of "attempt and abort".

Some systems avoid collisions by providing a delay line, as described by T. Suda et al. in "Tree LANs with Collision Avoidance: Protocol, Switch Architecture and Simulated Performance", ACM 089791-279-9/88/008/0155, or a buffer, like the register-insertion systems described by Hilal et al. and Liu et al., supra, for alleviating the corruption of data because of simultaneous access. The tree LAN system described by T. Suda et al., supra, uses the concept whereby a node in the tree can switch to one of a number of simultaneous incoming messages and thereby avoid a collision. The unselected messages are aborted, so this system is in the class of "attempt and abort". The messages which are aborted must be retransmitted to the node at a later time.

Systems which use adaptive or random assignment at high data rates usually incorporate a second collision free protocol which is used at high loads to eliminate the capacity reductions due to collisions. Such systems are classified as hybrid systems. For example, systems exist which use CSMA protocol at low loads but switch to a conflict free mode at higher load levels. Systems of this type have been described by M Skov, supra, and A. Bhargava, J. F. Kurose and D. Towsley in "A Hybrid Media Access Protocol for High-Speed Ring Networks", *IEEE Jour. on Selected Areas in Communications*, vol. 6, no. 6, July 1988, pp. 924-933.

As noted previously, high data rate systems are required to support integrated traffic. Many demand assignment protocol systems use a priority scheme based on upon either timing, rounds or reserved slots. Grow in U.S. Pat. No. 4,445,116 discloses a method for allocating bandwidth based upon target token rotation time (TTRT) and actual token rotation time. M. Zafirovic-Vukotic et al., supra, describe reserved slot and rounds systems for various slotted ring systems, and M Skov, supra, briefly discusses integrated traffic schemes for systems including reserved slots for reservation access in the DQDB system, polled access and slotted ring systems.

The uniframe method for integrated traffic uses assigned slots within a fixed frame. Unreserved slots can be used by a second access protocol such as token ring which is discussed by F. Ross, supra, and the proposed ANSI FDDI specifications. A second method of using uniframe is by limiting the time period of the uniframe to less than a full cycle and allowing a second access protocol to operate in the remaining period. This concept has been employed in a system known as Dynamic Resource Allocation in Metropolitan Area Networks (DRAMA) as described, for example, by K. Maly et al. in "Traffic Placement Policies for a Multi-band Network", ACM SIGCOMM '89 Symposium, Austin, Tex, Sept. 1989, pp. 94-105.

The major deficiency with these schemes is that they require either some form of master controller or an established initiation procedure in order to regulate the system. For instance, in uniframe and some timing and reservation systems, the master controller must assign slots to the synchronous traffic. Thus, a complex protocol must be established so that each node requests and knows not only its slot assignments but all other nodes' slot assignments as well so that reserved slots are not inadvertently corrupted. If a master controller is not used, as in FDDI I, the nodes must negotiate prior to ring operations. Changes to handle unanticipated traffic can not be made without halting and reinitiating ring operation. If nodes are free to reserve slots without a master controller, then capacity may be wasted or a node may hog the network.

Various CSMA collision detection (CSMA/CD) protocols are known in the prior art. See, for example, U.S. Pat. No. 4,707,829 to Pendse which discloses a CSMA/CD system that uses a unidirectional bus which is looped. Stations wait until the channel becomes idle and then transmit at the beginning of the next contention slot. The transmission is accepted if no other upstream station transmits, but if an upstream transmission is detected, the transmission is halted. Other examples of CSMA/CD systems are disclosed in U.S. Pat. No. 4,516,239 to Maxemchuk and U.S. Pat. No. 4,566,097 to Bederman. In the Bederman system, if a message arrives from upstream while a station is transmitting, the station checks priority of the incoming message. If the priority is less than or equal to the station message, the station continues to send its message. If priority is greater, the station aborts its message and forwards the incoming message. The station also aborts its message if it receives a start of a frame message which would contain synchronous data.

U.S. Pat. No. 4,549,292 to Isaman et al. discloses a method of efficiently and simultaneously transmitting both isochronous and nonisochronous data in a computer ring network. The terms "synchronous", "periodic" and "isochronous" may be used interchangeably. "Isochronous" has the additional connotation that the period is 125 microseconds, which corresponds to the frame rate used by commercial telephone systems, although Isaman et al. do not mention, nor does their system strictly require, 125 microsecond intervals. Isaman et al. use a token to designate a single station transmitting asynchronous data. As this packet propagates around the ring, any station with synchronous data may interrupt this message by inserting a control character followed by the message followed by a terminating control character. Stations upstream from the inserting station may add their synchronous data between the control characters. Alternatively, they can add another synchronous data block some other place in the asynchronous message. When the synchronous data block travels to the asynchronous sending station, it must interrupt its transmission and forward the synchronous block. It then resumes its transmission until another data block arrives or it finishes its transmission.

The Isaman et al. system lacks flexibility and limits data rate. Stations do not act independently upon detection of an idle condition on the network but must wait for a token or other control before sending asynchronous data. Other stations must buffer the incoming signal while transmitting synchronous data, and the station transmitting asynchronous data when interrupted by synchronous data must halt and then re-initiate transmission after passage of the synchronous data. The approach taken by Isaman et al. is similar to register-insertion of Hilal et al. and the Tree LAN system of Suda, described above.

A number of reservation access protocol systems have been described in the literature. See, for example, Chapter 3 of A. S. Tanenbaum, *Computer Networks*, 2nd Ed., Prentice-Hall, 1988. These schemes, which are also in the class of collision free protocols, generally work only for lower data rate systems, do not differentiate between types of traffic, and operate singly. U.S. Pat. No. 4,383,315 to Torng describes the concept of time slots that travel around a ring and are forwarded without interruption from a transmitter to a receiver. For synchronous traffic, time slots are reserved and may be used by the receiver to return data to the transmitter forming a full duplex circuit. For asynchronous data, a complex procedure for seizure and release of non-reserved time slots is invoked by stations having traffic.

SUMMARY OF THE INVENTION

It is therefore an object of the present invention to provide a new access control method for ring or unidirectional bus networks that support high data rates of diverse synchronous and asynchronous traffic.

It is another object of the invention to provide a new reservation packet scheme for fixed length, non-corrupting, circulating network structures that enables the nodes in the network to reserve space for synchronous traffic and guarantee access to each node in the network.

According to one feature of the invention, access to the network is controlled by a new process. When the node senses the channel is idle, it can begin to transmit. If it senses an incoming signal, it must stop transmitting. Unlike other adaptive or random assignment access protocols which abort the transmission when a collision occurs or is imminent, this new process truncates the information in a fashion such that it can be resumed later when the channel again becomes idle. The system is called Carrier Sensed Multiple Access - Ring Network (CSMA/RN) and is characterized that rather aborting a transmission upon receipt of an incoming signal, CSMA/RN truncates the message. The stations in the network operate independently, allowing more than one to be transmitting at the same time.

The CSMA/RN protocol may be characterized as an adaptive or random assignment access protocol which uses "attempt and truncate" as opposed to other protocols in the same class which use "attempt and abort" or demand assignment protocols which may use "attempt and defer" and/or "attempt and hold" protocols of the prior art. Truncating alleviates the wasted capacity that exists at high loads in other adaptive or random assignment access protocols.

This new protocol also realizes considerable advantages over prior art systems. First, each node can operate independently, sensing and responding only to incoming messages from its upstream neighbor. This simplifies node operations and logic. Second, the amount of space occupied by a packet decreases as network rate increases. For example, at 100 Mbps, a 2K bit packet occupies a space of approximately 4 km along the network ring, but at 1 Gbps, this space is reduced to 0.4 km. Hence, a 1 Gbps, 10 km network can potentially have twenty-five separate 2K bit packets simultaneously in existence over its span. Thus, as bit capacity of the network increases with data rate, truncating a message when it is about to interfere with a message on the system and resuming it later when free space is available greatly improves the performance of the network. Third, by using the concept of always truncating incoming packets on to the network, messages on the network have absolute priority. This means that travel time for all messages on the network is fixed by their distance, by the speed of energy propagation within the network media and the delay occurring at each station. As a result messages or control packets can circulate around the network with a fixed period. This provides a known synchronism for establishing timing for synchronous traffic.

According to another feature of the invention, further guaranteed (time and bandwidth) access for synchronous traffic is effected by a circulating reservation packet which permits a node to have reserved space when the special packet returns. The Circulating Reservation Packet (CRP) is a new access concept developed for CSMA/RN but applicable to other fixed length, non-corrupting, circulating network structures to enable the nodes in a network to reserve space for synchronous traffic and guaranteed access. The CRP is a small packet or group of packets which circulate continuously around the network. As needed, as when new voice and/or video data or a critical message has arrived, the node captures a free CRP and places its space requirement request into the packet. As the CRP circulates, other nodes free and/or keep free the requested space. When the CRP returns, the node fills the free space behind it. Nodes can share CRPs on a round robin or other controlled basis so that all nodes obtain fair access for their synchronous traffic. Hence, a node is provided guaranteed access regardless of the traffic conditions.

A specific feature of the invention is the combining of the media access protocols, CSMA/RN and CRP, in a single ring network to support integrated traffic. The result is a hybrid protocol system for the purpose of supporting integrated traffic in high data rate networks as opposed to previous hybrid systems used to alleviate capacity degradation due to collisions. Neither protocol is based upon uniframe operations. The synchronous traffic protocol uses the CRP protocol reservation system, while the asynchronous messages use the CSMA/RN protocol. The fact that packets circulate around the network at a fixed period assures that a CRP packet which supports synchronous traffic arrives at a node at periodic intervals. Single or multiple CRPs may be used with the CSMA/RN protocol, although multiple CRPs can improve performance. These dual protocols support integrated traffic in an efficient manner, providing superior performance to either FDDI or DQDB.

BRIEF DESCRIPTION OF THE DRAWING

The foregoing and other objects, aspects and advantages will be better understood from the following detailed description of a preferred embodiment of the invention with reference to the drawings, in which:

FIG. 4 is a block diagram showing the format of a packet in a preferred embodiment of the invention;

FIG. 5 is a frame format showing a CRP information structure according to a preferred embodiment of the invention;

DETAILED DESCRIPTION OF A PREFERRED EMBODIMENT OF THE INVENTION

Figure 1:
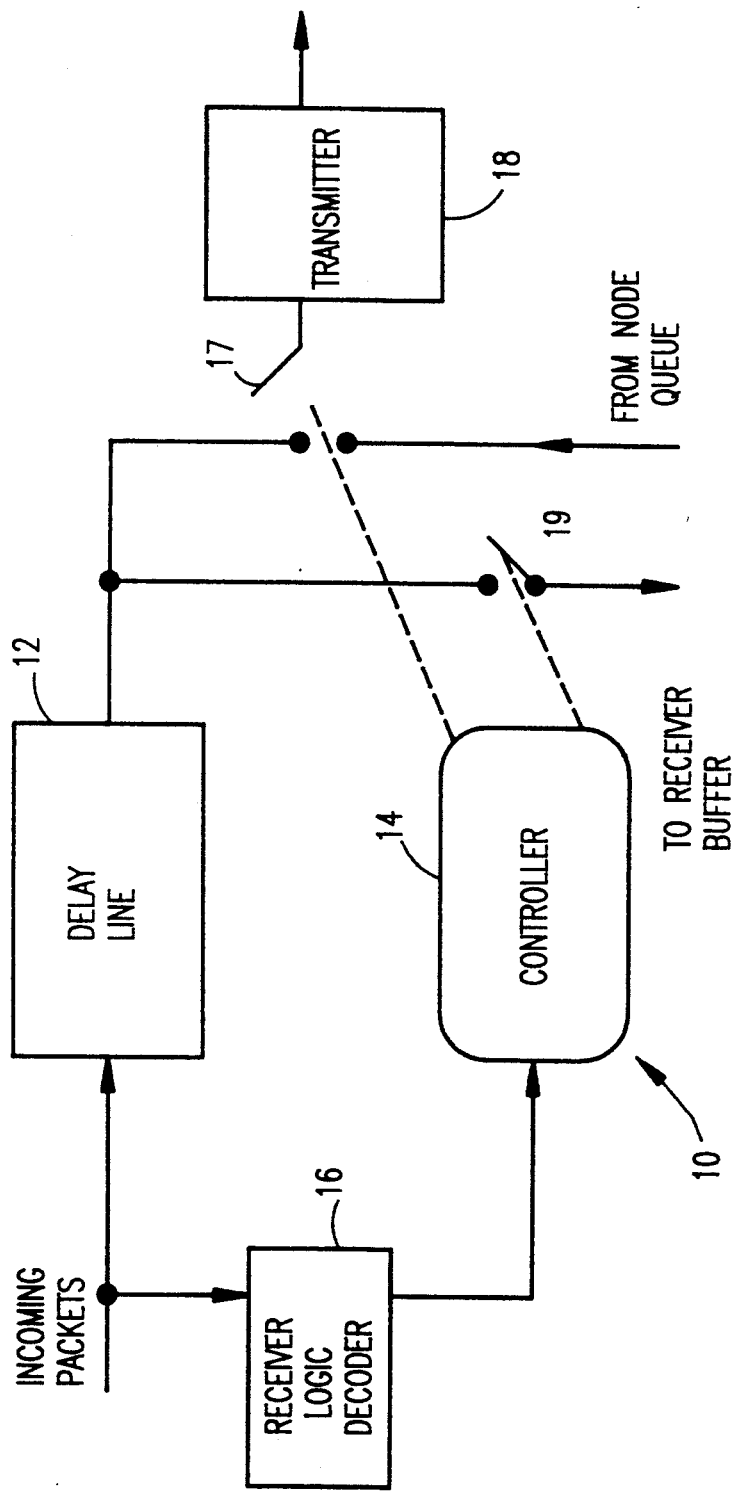
FIG. 1 is a simplified block diagram showing the node access logic according to the invention.

Referring now to the drawings, and more particularly to FIG. 1, there is shown the node access controller logic 10. The incoming signal is split into two streams, one through a delay line 12 and the other through a controller 14 via a receiver logic decoder 16. The delay line 12 permits the node logic time to determine an impending collision and to take the actions necessary to truncate any transmit conditions successfully. The delay line 12 can be relatively short if high speed logic is used in the controller logic 10. For example, a 100-bit delay at 1 Gbps is approximately a twenty meter piece of optical fiber and creates a 100 nanosecond delay. The node controller 14, based upon information decoded in the receiver logic 16, is required to make a number of decisions. First, it must detect the presence of incoming data. If incoming data exists, controller 14 connects the input of transmitter 18 to the output of delay line 12 via switch 17. The node must always propagate incoming information as the outgoing signal to the next node on the ring because it would be impossible to recreate the packet unless much larger storage is provided. If no incoming data exists, the node is free to place its own data on the ring via transmitter 18 if its queue is not empty. The controller 14 does this by connecting the input of transmitter 18 to the node queue (not shown) via switch 17. However, if during the time this latter data is being transmitted an incoming packet arrives, then the node, within the time limits dictated by its delay line 12 size, must discontinue its transmission and handle the incoming packet. When truncating a packet, the node places a terminator block at the end to assist the receiving node with re-accumulating fractured massages. Hence, packets once on the ring take precedence over insertion of new packets.

Packets are tested at each node to determine if the incoming packet is destined for this node and should be copied to its receiver data buffer. This the controller 14 does by connecting the output of the delay line 12 to the receiver data buffer (not shown) via switch 19. Alternatively, the information can be transferred directly from the controller logic 10 to the receive data buffer without using a switch at the end of delay line 12, since address decisions are required by the controller 14. Packets are nominally removed at their destinations since destination removal increases network capacity significantly. As a protection against packets circulating continuously in case of a node failure or address errors, packets are removed by the source after one or more rotations by comparing addresses against an established list or by implementing a packet monitor system.

Figure 2:
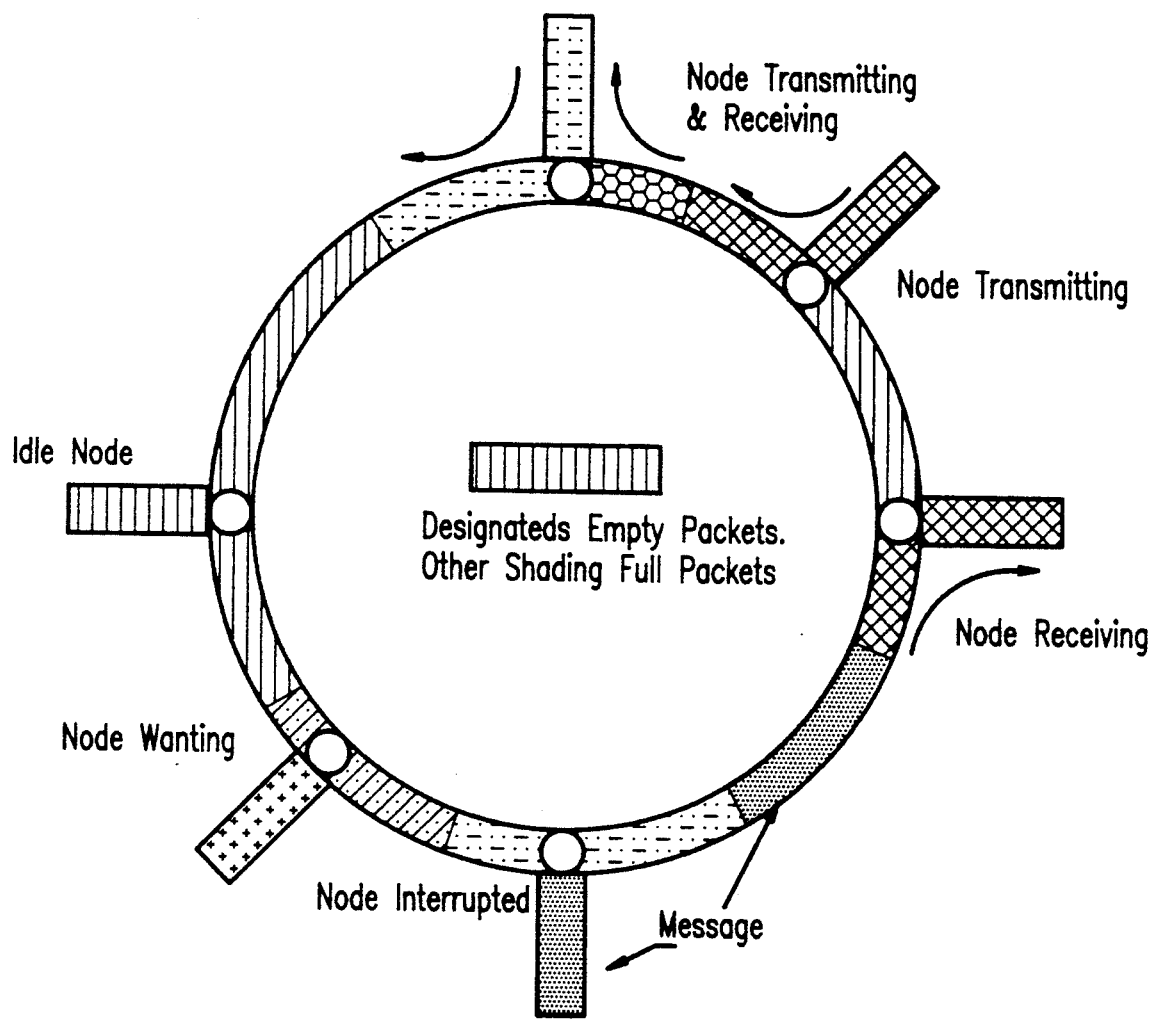
FIG. 2 is a topographical illustration of a ring network illustrating CSMA/RN protocol operations.

FIG. 2 illustrates a model of a ring network on which the CSMA/RN protocol is implemented. It shows the events that can occur at each node based upon the travel of empty and full packets of data around the ring as time progresses. The events are those which can occur at a node by the arrival of a message, by the condition that an empty packet is passing the node when a message arrives, by the arrival of an empty packet at a node which has a queued up message, by the arrival of a packet destined for a node and by interrupting a node which is transmitting. It will be observed that although the logic conditions at each node are simple, the logic conditions for the ring become quite complex when it contains a large number of nodes and the decisions at a node eventually influence other nodes on the ring.

In the Circulating Reservation Packet (CRP) protocol, a special small packet, about one hundred bits, circulates continuously around the ring. Synchronous traffic is attached behind this packet. On the cycle prior to the node's need to submit synchronous and/or critical traffic, the node through the packet requests a block of space following the packet be freed for its use on the next cycle. The node is free to set this indicator whenever it has synchronous traffic and the reservation packet's in-use flag is free. When the node makes the reservation, it also sets this flag to busy and, after a complete cycle, the node changes this flag to free and sends its synchronous message(s) in the free space behind the CRP. In most cases, the capacity reduction due to a circulating reservation packet alone is small so that a network can have one or more CRP packets, depending on node count and ring length. The separation of the CRPs will limit the size of regular data packets as well as the size of the synchronous messages a node can send at one time. The block size requested by a CRP depends upon the synchronous traffic bandwidth required and the inter arrival time of the useable circulating packets.

As the CRP circulates around the network, the space behind the CRP is freed as the packets arrive at their designated destinations. Pre-use is available since this space can be used further if the destination node or any subsequent node has a message for any node between and up to the node which has set the CRP flag to busy. In addition, the node controlling the circulating packet does not need to request space to a greater extent than needed. For example, a telephone call which goes into the non-talk mode requires no or only a minimal block of reserved space during this phase. Hence, recovery is automatically provided by nodes tempering their space requests. As a result, the CRP system and handling of synchronous traffic should cause minimal impact on the underlying asynchronous network protocol.

Access is guaranteed one revolution after receipt of the CRP. To guarantee that nodes have access to free circulating packets requires that a node cannot use a circulating packet on a number of successive revolutions. By passing CRPs on, every node will get to see a free CRP within a fixed number of ring revolutions. Alternatively, CRPs can be assigned to particular nodes, with a CRP serving each of its assigned nodes in a round robin fashion. Further, in the case of longer distance rings, each node may have one or more CRPs designated to serve it only. Access time depends upon the conditions established for network operations based upon the number of nodes, the number of CRPs and the ring length.

There is actually no need for a node having new synchronous traffic to establish a call in the general case, since when the node gets its free CRP, it can request additional reserved space within the limit of the space following the CRP. This provides great flexibility but can limit the amount of traffic that a node can send at one point. However, if the node cannot get all its traffic placed or its inter-access time is too long, then it should use or establish another CRP on the network. If a new CRP is to be established by a node, it must coordinate with the other nodes since the placement of a new CRP will affect the other nodes related to both access time and amount of synchronous bandwidth available at the arrival of a free CRP.

Figure 3:
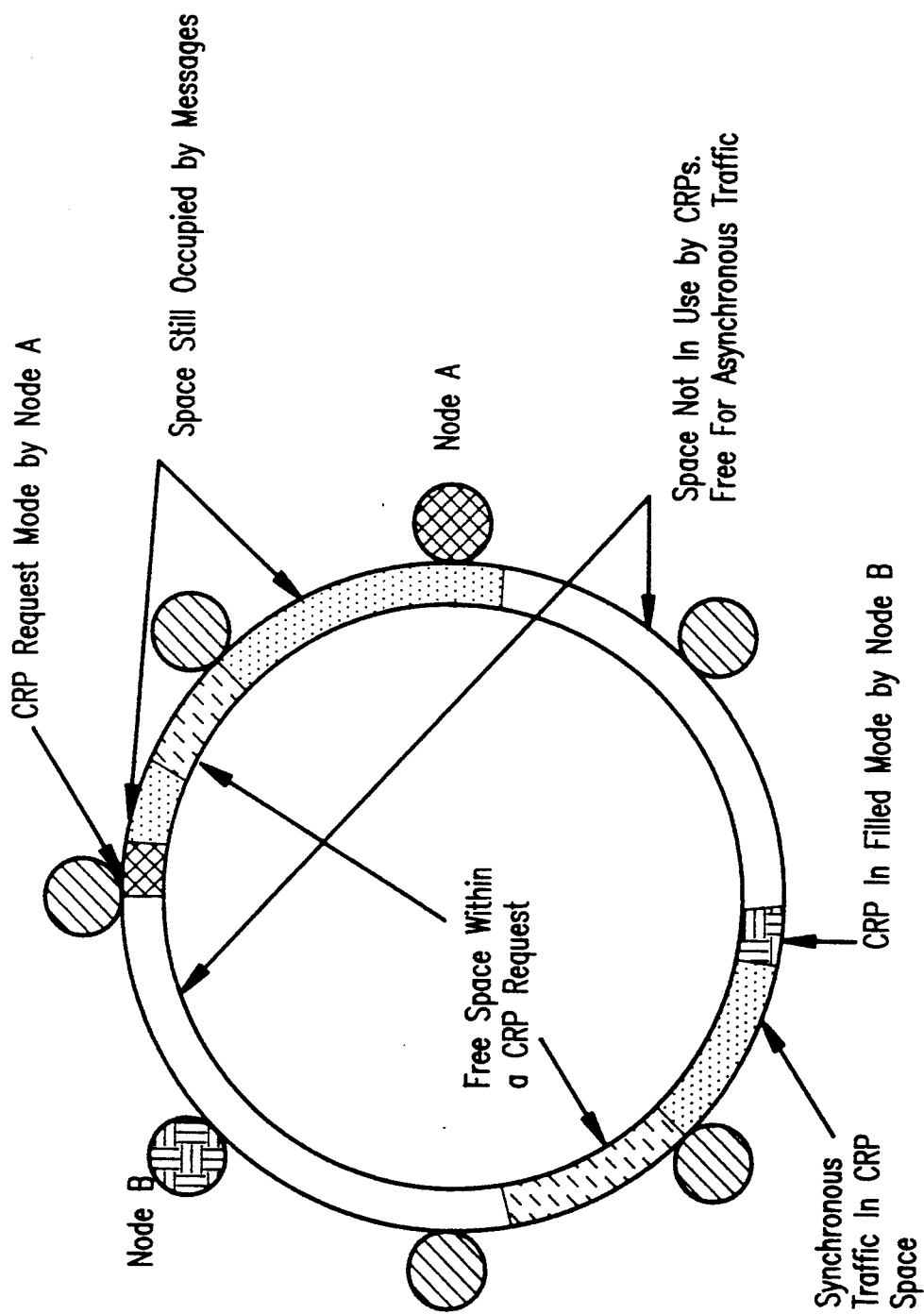
FIG. 3 is a topographical illustration of a ring network illustrating CRP protocol operations.

FIG. 3 illustrates a model of the ring network on which the CRP protocol is implemented. Two CRPs are shown. One CRP is in use by node A which has requested space to be freed for the next time the CRP arrives at node A. As depicted, some of the space has been freed while other space is still occupied by the messages destined for nodes up to and including node A. With pre-use as described previously, the condition of the space requested by node A can change during the circulation of the CRP. The second CRP is free but has just been used by node B to transmit its synchronous messages. As illustrated, node B used Last Out, First In placement of its synchronous traffic so that the maximum contiguous free space block is created as nodes down stream from node B remove synchronous message traffic. The CRP used by node B is now free for capture by another node. FIG. 3 also illustrates the character of the free space available for asynchronous traffic while CRPs are operating. The space includes space not related to any CRP plus space within the CRP's span which is free in either a normal or pre-use mode.

Because call setup operation is minimal, CRP operations can be used for acknowledge operations and fairness control. For acknowledge, when a node sends a packet for which correct delivery should be assured, it sets an acknowledge flag in the packet header. Upon receipt of the packet, the destination checks the packet for correctness and during its next CRP access, it sends an acknowledge message. The source node has considerable information concerning when this acknowledge should be returned. First, based on distance, it knows when the destination will get the packet to be acknowledged and, based upon CRP usage, when the destination will set its next CRP. Thus, it can predict apriori the interval before the acknowledge arrives so it knows precisely how long that its packet buffer will be occupied.

Fairness control operates in a similar manner. One CRP provides a mechanism for determining the mean wait time per node and mean bit rate per node for the network. When a node fails to obtain access so that its wait time rate becomes too large and/or its bit rate too small, it can use the CRP to reserve space for packets which have waited too long. It knows precisely the maximum wait time before access will be obtained.

The frame format for a data packet, either synchronous or asynchronous, is shown in FIG. 4. The packet is of variable length, depending on the number of bytes of data; however, the header and trailer are of fixed lengths. Specifically, the header comprises an 8-bit preamble for synchronization, four bits for control, sixteen bits for the destination address, sixteen bits for the source address, and four bits for the packet count. The trailer comprises eight bits for the end block and sixteen bits for CRC (cyclic redundancy check) code.

A 5/4 encoding scheme similar to that used in other fiber-optic network systems, as for example FDDI, is assumed. Encoding permits designation of non-data encoded sequences which can be used for header and end blocks and assists in the detection of bit errors in the data stream. The header/preamble consists of two blocks whose encoding is the largest Hamming distance from the idle block and does not represent any valid data blocks. This allows the detection and synchronization in the case of bit errors.

The four control bits allow for ring and message control and comprise an M-bit, a T-bit, an R-bit, an S-bit. The M-bit is used as a monitor system to detect packets which may be in error. All transmitters set the monitor bit. The monitor station resets the bit. If the monitor station detects a packet with its monitor bit reset, it removes the packet from the system. The T-bit is set for ring control or to designate a Circulating Reservation Packet (CRP). It is reset for general data packets. The R-bit is set by the transmitting station if it requests that the receiving station acknowledge (ACK) the receipt of the packet. Note that for ring control packets, the R-bit can be used as an additional signal since these packets are never acknowledged. The S-bit is a spare bit.

The address bits comprise a total of thirty-two bits designating both the destination and source addresses. The destination address is given first to enable the controller logic at a node to have more time. Stations can have multiple addresses in order that multicast and broadcast can be implemented.

The packet count bits enable the receiving station in conjunction with the source address to determine the placement of the packet and hence aids in re-accumulation of a message. The variable data block is encoded in the 5/4 bit encoding scheme to represent valid data only. The encoding further contributes to the reliability of the network since invalid blocks indicate that a bit error has occurred.

Like the preamble, the end block is a unique set of 5/4 encoded bits which are different from any data words and signify the end of the data section. Finally, the CRC bits are calculated by the high speed ring access chip and appended to the back end of the packet. The CRC is not recalculated by the receiving station when the message is being forwarded but only for new messages entering from the transmit queue. An incorrect CRC will cause the receiving buffer to delete the packet it has accumulated and to request the transmit logic section to send a Not Acknowledge (NAK) message to the sender.

FIG. 5 shows a packet frame structure for CRPs. The synchronous header, control, end and CRC blocks are identical in character to those in the data frame. The control bits, M, T, R, and S, are used to designate that the packet is a CRP. The node address is used to show which node has reserved the CRP and is requesting free space. A free CRP is designated by a special node address. The CRP packet number is used if CRPs are assigned to particular nodes so that a node can determine if this is the correct CRP to use. The reservation length contains the free space block requested in bytes for an in-use packet and can be ignored for a free CRP.

Figure 6:
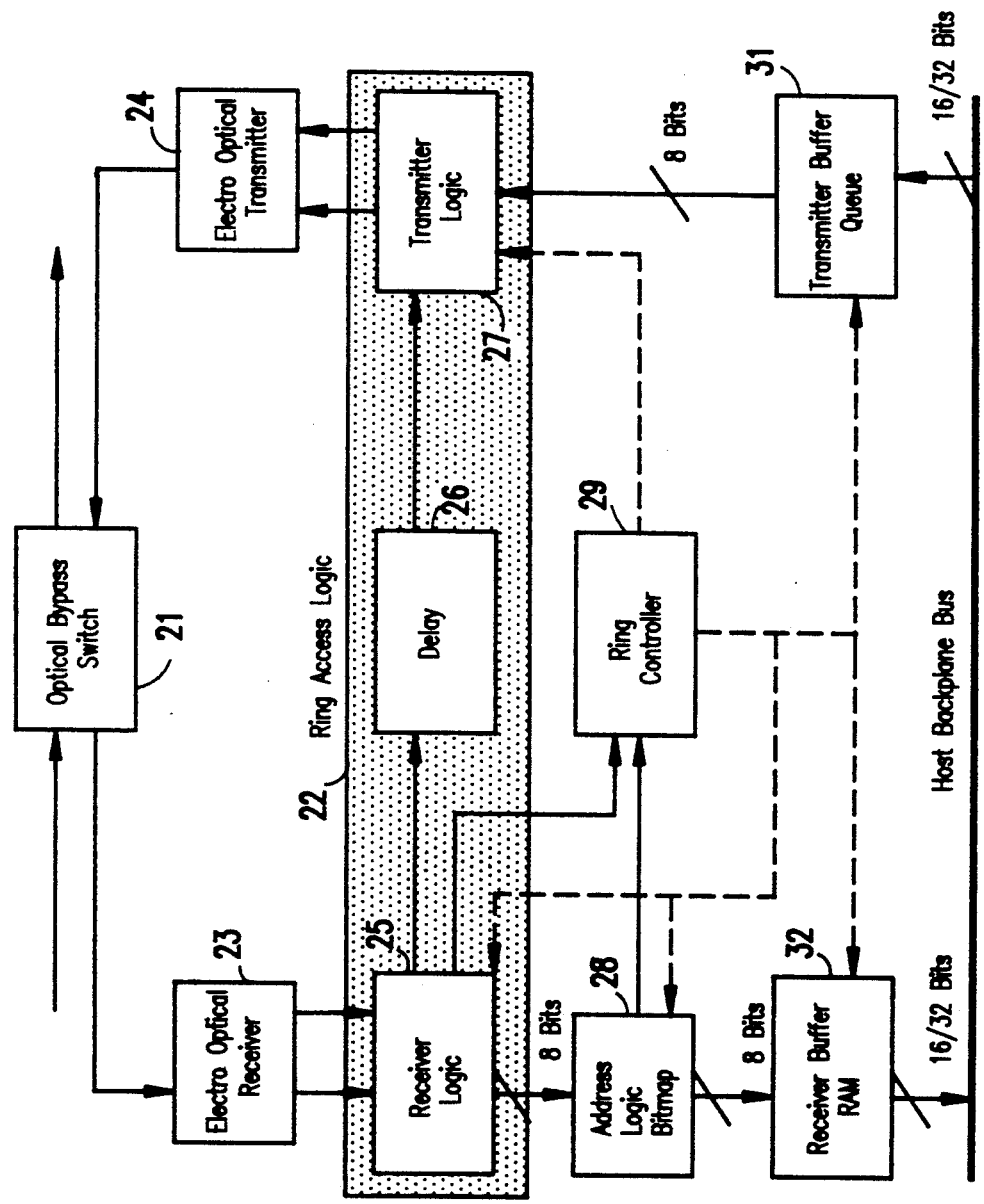
FIG. 6 is a block diagram showing in more detail the ring station according to a preferred embodiment of the invention.

The ring controller logic is shown in more detail in FIG. 6. The optical bypass switch system 21 provides a means to maintain network continuity in case the node optical electronic system should fail. It contains an equivalent time delay optical link so that the length of the network remains the same regardless of the node's operational status. The major logic operations occur in the ring access logic system 22 and the ring controller 29. The ring access logic system 22 is composed of three basic units. These are the receiver logic 25, the delay 26 and the transmitter logic 27. The electro-optical receiver 23 provides for the decoding of the 5/4 block structure. The receiver logic 25 provides for the detection of a change between receive the idle state, for parsing the control bit logic and for accumulating the address structure for decision by the address decoder logic 28. The address decoder logic 28 provides further decision signals based upon source and destination addresses. The decisions from both the ring access receiver logic 25 and the address decoder logic 28 are passed to the ring controller system 29 which then establishes the control to be used for this packet and forwards the information to the ring access transmitter logic 27 and the transmit and receive buffer systems 31 and 32.

On the transmitter side, the electro-optical transmitter 24 provides for 5/4 encoding and generating the optical signal. The transmitter logic 27 selects a transmit buffer from which information is to be taken and creates the CRC check sum which is to be appended to the packets. The actual delay 26 in the ring access chip required for the system operations is implemented as a FIFO delay line.

Figure 7:
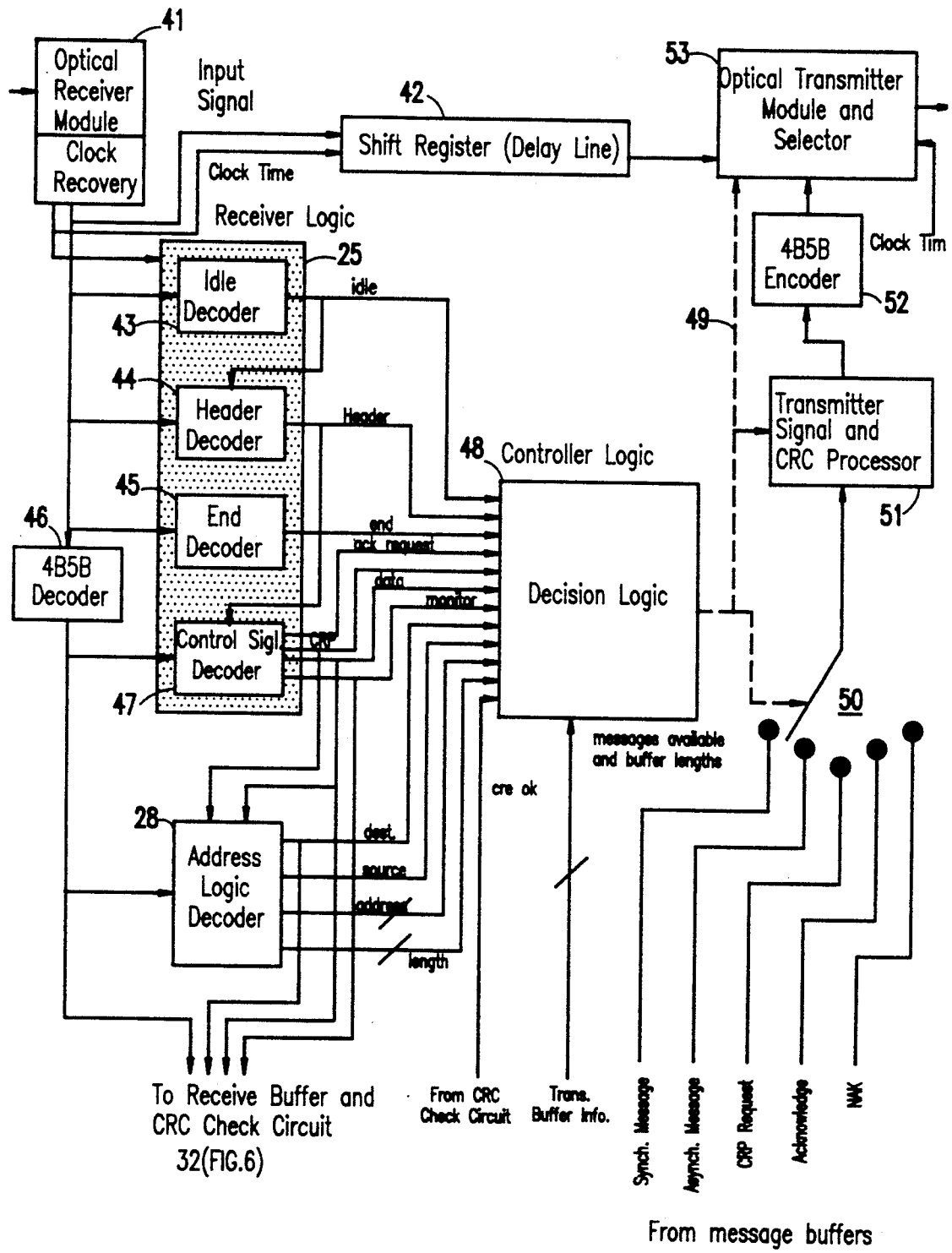
FIG. 7 is a block diagram showing an implementation of the receiver and transmitter sections of the ring station according to a preferred embodiment of the invention.

FIG. 7 shows an implementation of the receiver and transmitter sections of the ring station. The received optical signal is converted to an electrical signal in optical receiver module 41 which also recovers clock synchronization and forwards the signals to receiver logic 25 and delay line shift register 42. The optical receiver module may be implemented, for example, using conventional FDDI chip sets marketed by Advanced Micro Devices of Sunnyvale, Calif., or the Cambridge Ring system, as described by D. J. Greaves et al. in *The Cambridge Backbone Ring*, IEEE Document CH2826-5/90/0000/0008 (1990).

The frame structures, shown in FIGS. 4 and 5 for the data and control frames, are decoded in the receiver logic 25. More specifically, the receiver logic 25 comprises parallel decoders 43, 44 and 45 which receive the input signal from the optical receiver module 41 and decode, respectively, idle, header and end codes. The input signal from the optical receiver module is also supplied to 5/4 decoder 46 which provides an output to control signal decoder 47 in the receiver logic 25.

The idle decoder 43 provides an output to decision logic 48 and to the header decoder 44. The header decoder also provides an output to the decision logic 48 and to the control signal decoder 47. The control signal decoder, in turn, generates an ACK request signal, a CRP signal, a data signal, and a monitor signal, all of which are supplied to the decision logic 48. In addition, the output of the 5/4 decoder 46 and the CRP and data signals from the control signal decoder 47 are supplied to the address logic decoder 28 which supplies destination, source, address and length information to the decision logic 48. The output of the 5/4 decoder 46, the data and monitor outputs from the control signal decoder 47 and the destination signal from the address logic decoder 25 are supplied to the receiver buffer 32 (FIG. 6).

Alternate decoding structures could be used which produce equivalent signals. Actual decoding requires discrimination between bit patterns and can be implemented using a wide variety of logic circuit systems including programmed logic arrays (PLAs), hardwired logic circuits, programmed microprocessors, and the like, all of which are well known to those skilled in the art. Signals from the decoder elements are single line binary signals with the exception of the address and CRP length which are multiple bit parallel signals. Some decoder output signals are used as enabling signals for succeeding frame decoder and receiver buffer elements.

In addition to the signals from the decoders 43, 44, 45, 47, and 28, the decision logic 48 receives signals from the transmitter buffer queue. These various signals contain information concerning message conditions including availability, length, address locations and other conditions. The line count is variable depending upon the manner in which the transmitter queue buffer system is actually implemented. The decision logic 48, operating on combinations of the input signals and based on the protocol operating principals, selects the actual transmitter signal which is to be sent. The selector is diagrammatically illustrated as a switch 50, but it will be understood that solid state switching circuits are actually used to implement the selector. The selection made is from queues which represent various types of node messages that are available in the transmitter system. In actual practice, buffers and information structures relating to their contents may be address pointers or other data structures. The decision logic 48 is also used to regulate the transmitter operations and the transmitter and CRC signal process, as indicated by the dotted line 49.

The transmitter system consists of the transmitter signal process which accepts the message and conditions it for transmission on to the network by adding additional control structure. More specifically, the CRC processor 51 calculates a valid CRC block based upon the actual data signal being transmitted and appends the CRC block on the end of the frame, as shown in FIGS. 4 and 5. The message is then sent to the 5/4 encoder 52 and to the optical transmitter module 53 which selects whether the incoming signal, idle or the message is to be converted and sent. The selected signal is provided to the optical transmitter module 53 which converts the electronic signal into an equivalent optical signal regulated with a clock timer. Suitable hardware for the optical transmitter module 53 exists in the FDDI and Cambridge Ring systems, as noted above.

The circuit components of FIG. 7 are shown in functional block diagram form. Actual logic circuits and specific hardware depend upon the actual bit rate being used and other factors influencing actual circuit designs. These are, however, a matter of design choice and need not be described in more detail.

The unique and novel features of the CSMA/RN access mechanism are:

a. It provides instant access to the network at idle.
b. It eliminates the wasted capacity which occurs in other carrier sensed networks at high load levels since the node does not have to re-transmit the aborted information lost in the collision.
c. It can support multiple messages on the network simultaneously.
d. It can support a wide range of operational conditions, e.g., network lengths, number of nodes, size of messages, etc.
e. It is capable of operating at data rates greater than $10^8$ bps. Operational characteristics of this access method should improve as data rate increases.
f. Nodes operate independently on local information only, simplifying the node and network operations and logic systems.
g. There is no limit on useable message length because of protocol operations.
h. Destination removal can be implemented which increases significantly the network performance capacity.

The unique and novel features of the Circulating Reservation Packet (CRP) are:

a. It provides effective guaranteed access for critical and synchronous traffic.
b. All packets on the network related to CRP operation and use appear as data packets to the asynchronous media access protocol. This provides a dual media access protocol system where the synchronous traffic protocol, CRP, creates minimal interference with and impact on the asynchronous traffic protocol system, bit it CSMA/RN or some other access mechanism.
c. It does not interfere with traffic already on the network and its interference with traffic being placed by other nodes is minimal.
d. Only space actually needed by the active synchronous traffic is used. A telephone call in silent mode does not waste space since the node does not need to request space. Hence, no scheme is needed for bandwidth recovery.
e. It is feasible for a group of network systems other than CSMA/RN where information can be made to circulate continuously on a reasonably fixed cycle without interference from nodes accessing the network and corrupting permanent messages.
f. Pre-use can be implemented which significantly increases the network ability to support asynchronous traffic under high synchronous traffic loads.

While the invention has been described in terms of a single preferred embodiment, those skilled in the art will recognize that the invention can be practiced with modification within the spirit and scope of the appended claims. Specifically, another embodiment of the invention could use virtual circuit concepts which exist in present and future telephone systems as a replacement for the underlying physical optical links and associated connections considered in the disclosed embodiment.

Having thus described our invention, what we claim as new and desire to secure by Letters Patent is as follows:

1. In a ring or unidirectional bus network having a plurality of nodes to which are connected a plurality of computer stations, a method for efficiently transmitting data on said network allowing multiple messages on the network simultaneously, said method being performed by control logic at each of said nodes and comprising the steps of:
    sensing a carrier on said network to detect the presence of incoming data at the node;
    if the incoming data is addressed to the node, receiving the data and removing it from said network;
    if the data is not addressed to the node, retransmitting the data with fixed delay;
    if the node is transmitting data at the time of receipt of incoming data and the incoming data is not addressed to the node, truncating the data being transmitted and retransmitting the incoming data;
    if transmitting data at the time of receipt of incoming data addressed to the node, continuing to transmit data while receiving data.

2. The method recited in claim 1 wherein data transmitted on said network is transmitted in a packet including destination and source addresses further comprising the step of checking incoming data for the node's own source address and removing said data from said network.

3. In a ring or unidirectional bus network comprising a plurality of nodes to which are connected a plurality of computer stations, a method for efficiently transmitting both synchronous and asynchronous data on said network, said method comprising the steps of:
    circulating a plurality of circulating reservation packets on said network;
    using a predetermined protocol, accessing by control logic at each of the nodes said network to transmit asynchronous data;
    when synchronous data is to be transmitted by a respective one of said nodes, setting by the node a flag and space required in one of said circulating reservation packets to reserve space behind said one of said circulating reservation packets for said synchronous data; and
    upon return to the one said node of said one of said circulating reservation packets, resetting said flag and transmitting said synchronous data in space reserved behind said one of said circulating reservation packets.

4. In a ring or unidirectional bus network having a plurality of nodes to which are connected a plurality of computer stations, a method for efficiently transmitting both asynchronous and synchronous data on said network allowing multiple messages on the network simultaneously, said method comprising the steps of:

circulating at least one circulating reservation packet on said network;

when synchronous data is to be transmitted by a respective one of said nodes, setting by the node a flag in said circulating reservation packet to reserve space behind said circulating reservation packet for said synchronous data;

upon return to said one node of said circulating reservation packet, resetting said flag and transmitting said synchronous data in space reserved behind said circulating reservation packet;

sensing by control logic at each node a carrier on said network to detect the presence of incoming data to the node;

if the incoming data is addressed to the node, receiving the data and removing it from said network by said node;

if the data is not addressed to the node, retransmitting by said node the data with fixed delay;

if the node is transmitting asynchronous data at the time of receipt of incoming data and the incoming data is not addressed to the node, truncating the asynchronous data being transmitted and retransmitting the incoming data; and if transmitting data at the time of receipt of incoming data addressed to the node, continuing to transmit data while receiving data.

5. The method recited in claim 4 wherein data transmitted on said network is transmitted in a packet including destination and source addresses further comprising the step of checking incoming data for the node's own source address and removing said data from said network.

6. The method recited in claim 5 wherein a plurality of circulating reservation packets are made to circulate on said network.

7. A ring or unidirectional bus network having a plurality of nodes to which are connected a plurality of computer stations, a control logic at each of said nodes for efficiently transmitting data on said network allowing multiple messages on the network simultaneously, said control logic at each of said nodes and comprising:

means for sensing a carrier on said network to detect the presence of incoming data to the node;

means for receiving the data at the node and removing it from said network if the incoming data is addressed to the node;

means for retransmitting the data with fixed delay if the data is not addressed to the node;

means for truncating the data being transmitted and retransmitting the incoming data if the node is transmitting data at the time of receipt of incoming data and the incoming data is not addressed the node;

means for continuing to transmit data while receiving data if transmitting data at the time of receipt of incoming data addressed to the node.

8. The network recited in claim 7 wherein data transmitted on said network is transmitted in a packet including destination and source addresses further comprising means for checking incoming data for the node's own source address and removing said data from said network.

9. A ring or unidirectional bus network comprising a plurality of nodes to which are connected a plurality of computer stations, control logic at each of said nodes for efficiently transmitting both synchronous and asynchronous data on said network, said control logic comprising:

means for circulating a plurality of circulating reservation packets on said network;

means for accessing said network to transmit asynchronous data using a predetermined protocol;

means for setting a flag and space required in one of said circulating reservation packets to reserve space behind said one of said circulating reservation packets for said synchronous data when synchronous data is to be transmitted by a respective one of said nodes; and means for resetting said flag and transmitting said synchronous data in space reserved behind said one of said circulating reservation packets upon return to the one said node of said one of said circulating reservation packets.

10. A ring or unidirectional bus network having a plurality of nodes to which are connected a plurality of computer stations, control logic at each of said nodes for efficiently transmitting both asynchronous and synchronous data on said network allowing multiple messages on the network simultaneously, said control logic comprising:

means for circulating at least one circulating reservation packet on said network;

means for setting by a node a flag in said circulating reservation packet to reserve space behind said circulating reservation packet for said synchronous data when synchronous data is to be transmitted by a respective one of said nodes;

means for resetting said flag and transmitting said synchronous data in space reserved behind said circulating reservation packet upon return to said node of said circulating reservation packet;

means for sensing a carrier on said network to detect the presence of incoming data to the node;

means for transmitting asynchronous data on said network if no incoming data is sensed;

means for receiving the data and removing it from said network by said node if the incoming data is addressed to the node;

means for retransmitting by said node the data with fixed delay if the data is not addressed to the node;

means for truncating the asynchronous data being transmitted and retransmitting the incoming data if the node is transmitting asynchronous data at the time of receipt of incoming data and the incoming data is not addressed to the node; and said means for transmitting continuing to transmit data while receiving data if transmitting data at the time of receipt of incoming data addressed to the node.

11. The network recited in claim 10 wherein data transmitted on said network is transmitted in a packet including destination and source addresses further comprising means for checking incoming data for the node's own source address and removing said data from said network.

12. The network recited in claim 11 wherein a plurality of circulating reservation packets are made to circulate on said network.

* * * * *